United States Patent [19]

Tanagawa

[11] Patent Number: 5,206,866
[45] Date of Patent: Apr. 27, 1993

[54] BIT ERROR CORRECTING CIRCUIT FOR A NONVOLATILE MEMORY

[75] Inventor: Koji Tanagawa, Tokyo, Japan
[73] Assignee: Oki Electric Industry Co., Ltd., Tokyo, Japan
[21] Appl. No.: 612,978
[22] Filed: Nov. 15, 1990

[30] Foreign Application Priority Data

Nov. 16, 1989 [JP] Japan .................... 1-298654

[51] Int. Cl.$^5$ ............................................ G06F 11/10
[52] U.S. Cl. ................................ 371/40.1; 371/13
[58] Field of Search ........................ 371/40.1, 51.1, 13

[56] References Cited

U.S. PATENT DOCUMENTS

| | | | |
|---|---|---|---|
| 3,430,197 | 2/1969 | Brown | 371/40.1 |
| 4,621,364 | 11/1986 | Tschoepe | 371/13 X |
| 4,774,712 | 9/1988 | Lewis | 371/51.1 X |
| 4,901,320 | 2/1990 | Sawada | 371/13 X |
| 4,955,023 | 9/1990 | Tanimoto | 371/40.1 |

FOREIGN PATENT DOCUMENTS 262452 4/1988 European Pat. Off. .
305987 3/1989 European Pat. Off. .

*Primary Examiner*—Charles E. Atkinson
*Attorney, Agent, or Firm*—Spencer, Frank & Schneider

[57] ABSTRACT

A bit correction circuit for a nonvolatile memory is connected between a non-volatile memory and a control circuit such as a microcomputer. The nonvolatile memory has a plurality of sets of memory cells. Each set comprises plurality of data cells for storing data and a parity cell for storing a parity bit. The bit error circuit comprises error checking circuit connected for receiving data read from the memory cells and the corresponding parity bit for checking the read data for an error and producing an error signal corresponding to the result of the error checking, holding and sense voltage switching circuit connected to the error checking circuit for holding the error signal and having an output for outputing a holding signal corresponding to the error signal until the next read operation is carried out, the holding signal being coupled for controlling the sense voltage of the nonvolatile memory, and address holding circuit having an input for receiving an address of the read data and connected to the holding and sense voltage switching circuit for holding the address of the read data in response to the holding signal for use the next read operation of the read data if an error in the read data is detected.

7 Claims, 4 Drawing Sheets

BIT ERROR CORRECTING CIRCUIT FOR A NONVOLATILE MEMORY

CROSS REFERENCE TO RELATED APPLICATIONS

This application claims the priority of Japanese Application Serial No. 1-298,654, filed Nov. 16, 1989, the subject matter of which is incorporated herein by reference.

BACKGROUND OF THE INVENTION

This invention relates to a bit error correcting circuit for a nonvolatile semiconductor programmable read-only memory (hereafter ROM) such as an electrically erasable and programmable ROM (hereafter EEPROM).

An EEPROM includes a storage MOS transistor as a memory cell and a sense amplifier. The storage MOS transistor has a thin oxide film (tunneling oxide film) and a floating gate. The arrangement and operation of the EEPROM is described in, for example, "16K Bit EEPROM Electrically Erasable In a Bit Unit", Nikkei Electronics, Jun. 23, 1980, pp. 198 to 207 and Japanese Laid-open Patent Application No. 1987/32823.

FIG. 1 shows typical characteristics of the memory cell of an EEPROM. A threshold voltage of the memory cell might change due to leakage of charge. Such leakage may be caused by degradation of the breakdown voltage of the tunneling oxide film after a large number of write-erase cycles, or by a pinhole of the tunneling oxide film. A threshold voltage Vt1 of the memory cell in a write state is about $-2$ V. On the other hand, a threshold voltage Vt2 of the memory cell in an erase state is about 8 V. When the threshold voltage Vt1 is deteriorated, it changes from about $-2$ V to about 2 V as shown at (a). When the threshold voltage Vt2 is deteriorated, it changes from about 8 V to about 2 V as shown at (b).

The sense amplifier of the EEPROM detects the threshold voltage of the memory cell and outputs data. When the threshold voltage Vt1 is lower than a sense voltage Vr, the sense amplifier outputs "1". On the other hand, when the threshold voltage Vt1 is not lower than the sense voltage Vr, the sense amplifier outputs "0". Therefore, when a low sense voltage Vr1, for example 1 V, is applied in case of the deterioration of the memory cell in write state, the output data is changed from "1" to "0". However, when a high sense voltage Vr2, for example 4 V, is applied in case of the deterioration of the memory cell in the write state, the output data is unchanged.

U.S. Pat. No. 4,901,320 discloses a bit error correcting circuit incorporated in a microcomputer. The disclosed bit error detecting circuit uses two different sense voltages and detects and corrects the error of the memory cell by a special program in the microcomputer. The disclosed bit error circuit needs special control signals such as EACC, WACC, EROM etc., as set forth at column 11 lines 28-36 of the specification. Further, the disclosed bit error detecting circuit has complex hardware as shown in FIGS. 6 and 7. Furthermore, the disclosed EEPROM has only one addressing mode because of the complex hardware of the bit error correcting circuit.

SUMMARY OF THE INVENTION

It is an object of the present invention to provide a bit error correcting circuit for a nonvolatile memory without using a special program.

It is another object of the present invention to provide a bit error correcting circuit for a nonvolatile memory which does not need a special control signal.

It is still another object of the present invention to provide a bit error correcting circuit for a nonvolatile memory having simple hardware.

The above and the other objects are accomplished according to the invention by the provision of a bit error correcting circuit connected between a nonvolatile memory and a control circuit connected to the nonvolatile memory for ordering a read operation to be carried out by the nonvolatile memory of data addressed by the control circuit, the nonvolatile memory having a plurality of sets of memory cells, each set comprising a plurality of data cells for storing data and a parity cell for storing a parity bit corresponding to the stored data, the data in the memory cells being detected by way of sense voltages. The bit error circuit comprises error checking means connected for receiving data read from the memory cells and the corresponding parity bit for checking the read data for an error and producing an error signal corresponding to the result of the error checking, holding and sense voltage switching means connected to the error checking means for holding the error signal and having an output for outputing a holding signal corresponding to the error signal until the next read operation is carried out, the holding signal being coupled for controlling the sense voltage of the nonvolatile memory, and address holding means having an input for receiving an address of the read data and connected to the holding and sense voltage switching means for holding the address of the read data in response to the holding signal for use the next read operation of the read data if an error in the read data is detected.

BRIEF DESCRIPTION OF THE DRAWINGS

These and other features and advantages of the invention will be further understood from the following detailed description of the preferred embodiment with reference to the accompanying drawings in which.

DETAILED DESCRIPTION OF THE PREFERRED EMBODIMENT

Figure 2:
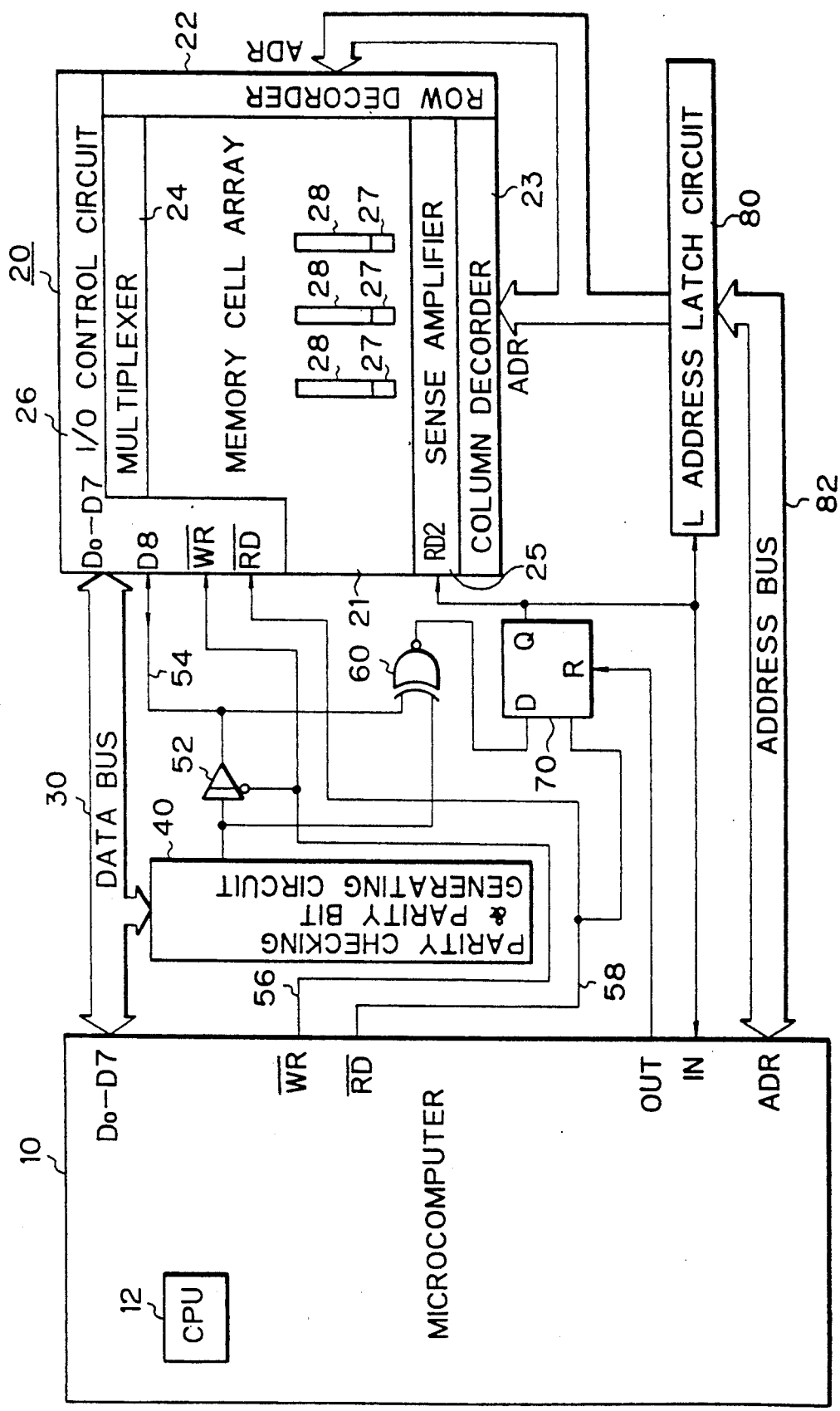
FIG. 2 is a block diagram of a microcomputer with a bit error correcting circuit for an EEPROM according to the preferred embodiment of the present invention.

FIG. 2 is a block diagram of a microcomputer with a bit error correcting circuit for an EEPROM according to the preferred embodiment of this invention. The entire circuit of this diagram may be formed in one semiconductor chip or a plurality of semiconductor chips as will be apparent to those skilled in the art.

A microcomputer 10 has a central processing unit (hereafter CPU) 12, first data terminals D0-D7, a first address terminal ADR, a first write signal terminal WR, a first read signal terminal RD, an output signal terminal OUT and an input signal terminal IN. An EEPROM 20 has a memory cell array 21, a row decoder 22, a column decoder 23, a multiplexer 24, a sense amplifier 25 and an input/output control circuit 26. The memory cell array 21 comprises a plurality of sets of cells, each set comprising a plurality of memory cells 28 for storing data and a parity cell 27 for storing a parity bit corresponding to the stored data. The input/output control circuit 26 has second data terminals D0–D7, a parity data terminal D8, a second write signal terminal WR, a second read signal terminal RD. The sense amplifier 25 has a sense voltage switching signal terminal RD2. The row decoder 22 and the column decoder 23 each have a second address terminal ADR. The first data terminals D0–D7 are connected to the second data terminals D0–D7 via a data bus 30. The data bus 30 writes data to the EEPROM 20 and inputs and/or outputs data of the EEPROM 20 between microcomputer 10. The data bus 30 is connected to a parity checking and parity bit generating circuit 40. The parity checking and parity bit generating circuit 40 detects an error of data read from the EEPROM 20 and corrects the error.

Figure 1:
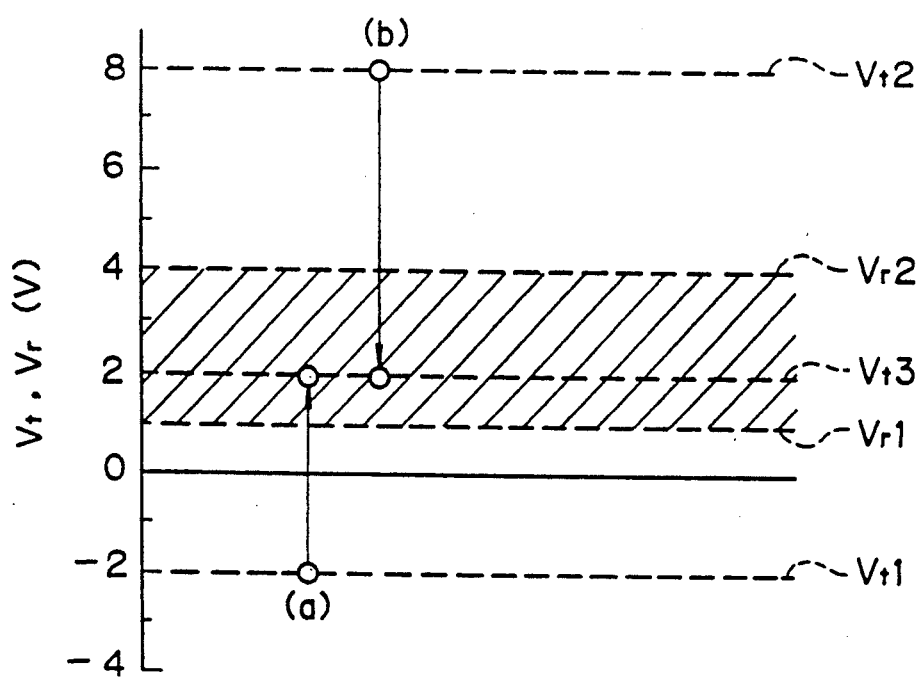
FIG. 1 is a graph showing typical characteristics of a deteriorated memory cell of a known EEPROM.
Figure 3:
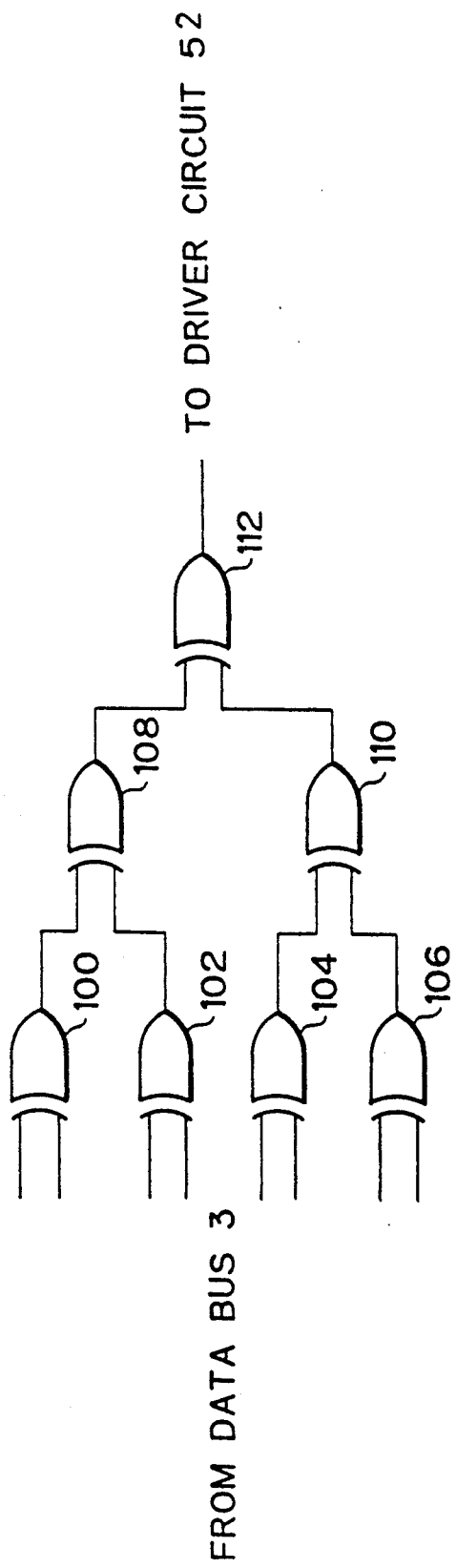
FIG. 3 is a schematic diagram of a parity checking and parity bit generating circuit according to the preferred embodiment of the present invention.

FIG. 3 is a schematic diagram of the parity checking and parity bit generating circuit 40 shown in FIG. 1. The parity checking and parity bit generating circuit 40 comprises eight exclusive NOR gates. Each of exclusive NOR gate 100, 102, 104 and 106 has two input terminals connected to the data bus and an output terminal. An exclusive NOR gate 108 has two input terminals connected to the output terminals of the exclusive NOR gate 100 and 102 and an output terminal. An exclusive NOR gate 110 has two input terminals connected to the output terminals of the exclusive NOR gate 104 and 106 and an output terminal. An exclusive NOR gate 112 has two input terminals connected to the output terminals of the exclusive NOR gate 108 and 110 and an output terminal.

Referring again to FIG. 2, the output of the parity checking and parity bit generating circuit 40 (the output terminal of the exclusive NOR gate 112) is connected to the parity data terminal D8 of EEPROM 20, via a driver circuit 52 and a parity bit data line 54. The parity bit data line 54 inputs and/or outputs parity bit data of the EEPROM 20.

The first read signal terminal RD is connected to the second read signal terminal RD via a read signal line 58. The first write signal terminal WR is connected to the second write terminal WR via a write signal line 56. The write signal line 56 is also connected to a control terminal of the driver circuit 52. An input terminal and an output terminal of the driver circuit 52 are connected to input terminals of a comparison circuit 60. An output terminal of the comparison circuit 60 is connected to a data input terminal D of a data holding and sense voltage switching circuit 70. The comparison circuit 60 compares the parity bit data read from the EEPROM 20 and the output of the parity checking and parity bit generating circuit 40. In this embodiment, the comparison circuit 60 is an exclusive NOR gate.

The data holding and sense voltage keeping circuit 70 holds the output of the comparison circuit 60 and switches a sense voltage of the sense amplifier 25 in accordance with the read signal. The data holding and sense voltage switching circuit 70 comprises a flip-flop circuit. A clock terminal of the data holding and sense voltage switching circuit 70 is connected to the read signal line 58. An output terminal Q of the data holding and sense voltage switching circuit 70 is connected to the sense voltage switching signal terminal RD2 of the EEPROM 20. A reset terminal of the data holding and sense voltage switching circuit 70 is connected to the output signal terminal OUT of the microcomputer 10.

The input signal terminal IN of the microcomputer 10 is connected to the sense voltage switching signal terminal RD2 of the EEPROM 20 and to a latch terminal L of an address latch circuit 80. The first address terminal ADR of the microcomputer 10 is connected to an input terminal of the address latch circuit 80 via an address bus 82. An output terminal of the address latch circuit 80 is connected to the second address terminal ADR of the EEPROM 20. The address latch circuit 80 receives an address signal from the microcomputer and outputs it to the EEPROM 20. When the output of the data holding and sense voltage switching circuit 70 is "1", the address latch circuit 80 holds the inputted address.

The write and read operations performed by the microcomputer with the bit error correction circuit in FIG. 2 will now be explained.

(1) Write operation

In case of writing data to the EEPROM 20, eight bits of writing data D0 to D7 are outputted from the microcomputer 10 to the data bus 30. Each bit of the writing data is either "1" or "0". The parity checking and parity bit generating circuit 40 checks the data D0 to D7 on the data bus 30 (parity check) and outputs a logic "1" or "0" (parity bit). The outputed logic determines whether the number of the writing data is an even number or an odd number. When the write signal WR is outputted from the microcomputer 10, the driver circuit 52 is turned on and 8 bits of the writing data D0 to D7 on the data bus 30 and a parity bit D8 which is outputted from the parity checking and parity bit generating circuit 40 via the driver circuit 52 and is on the parity bit data line 54, are read into the EEPROM 20 as one word. That is, the word written in the EEPROM 20 comprises the data D0 to D8 (8 bits of write data and 1 bit of parity data).

Figure 4:
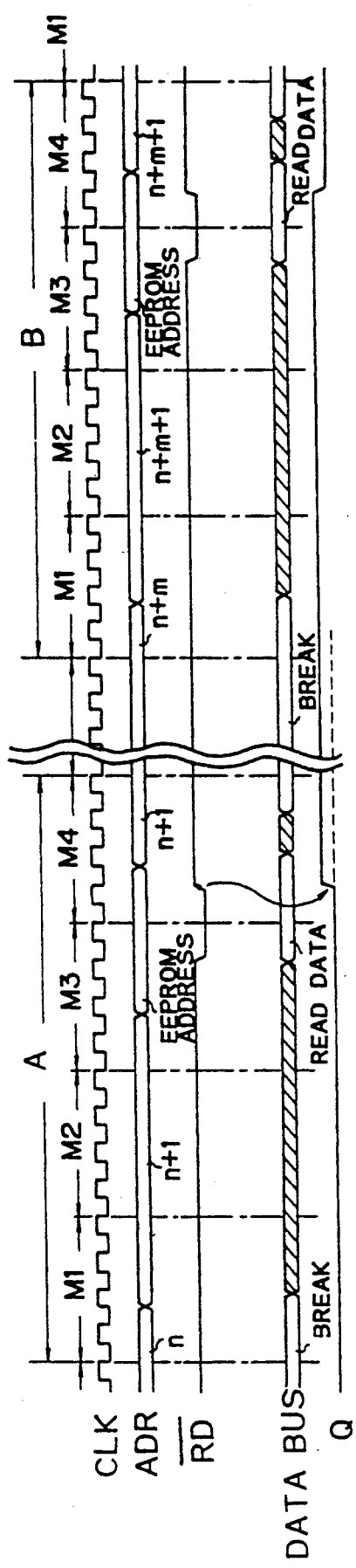
FIG. 4 is a timing chart showing how data are read from an EEPROM in FIG. 2.

The read operation will be explained with reference to FIG. 4. FIG. 4 is a timing chart which shows how data are read from the EEPROM. FIG. 4 shows two read cycle A and B. A read cycle is completed in four machine cycles M1 to M4 which are synchronized with a system clock CLK of the microcomputer 10.

(2) Read operation

A read operation of the data D0 to D7 from the EEPROM 20 is carried out in one cycle A if no error in the read data is detected and in two cycles A and B if an error is detected.

i) The first read cycle A

The read operation is carried out synchronized with the system clock CLK of the microcomputer. The read cycle A is divided in four machine cycles M1 to M4. In machine cycles M3 and M4, a read command signal RD and an address ADR of desired data are outputted from the microcomputer 10. The data D0 to D7 stored in the addressed set of data cells 28 in the EEPROM 20 are read out to the data bus 30. The corresponding parity data D8 stored in the EEPROM 20 is read out to one input terminal of the comparison circuit 60 through the parity bit line 54. The read out data D0 to D7 on the data bus 30 is checked by the parity checking and parity bit generating circuit 40 (parity check). The result of the checking (parity bit) is outputed to the other input terminal of the comparison circuit 60.

If the two inputs of the comparison circuit 60 are equal, (i.e. the parity bit of the read data corresponds to the parity bit of the written data), there is no error in the read data. In this case, the comparison circuit 60 outputs "0". The data holding and sense voltage switching circuit 70 holds its output Q at the logic "0" level until the read command signal RD is inputted in the data holding and sense voltage switching circuit 70. Then, another first read cycle A will be carried out.

If the two inputs of the comparison circuit 60 are different, there is an error in storing. The comparison circuit 60 outputs a logic "1" and the data holding and sense voltage switching circuit 70 holds its output Q at the logic "1" level until the read command signal RD is inputed in the data holding and sense voltage switching circuit 70. When the sense amplifier 25 receives the logic "1", it changes the sense voltage, for example, from +1V (the low sense voltage Vr1 in FIG. 2) to +4V (the high sense voltage Vr2 in FIG. 2). When the address latch circuit 80 receives the logic "1", it holds the address ADR received from the address bus 82. Furthermore, when the microcomputer 10 receives the logic "1" at the input signal terminal IN, it acknowledges the error in the stored data and carries out the second read cycle B.

ii) The second read cycle B

The operation of the second read cycle B is similar to that of the first read cycle A except for the changed sense voltage and the origin of the address. In the second read cycle B, the sense voltage is initially +4V and the address is not from the microcomputer 10 but rather is the address held in address latch circuit 80 from the first read cycle A. Therefore, in the second read cycle, the same data is again read out, but with a high sense voltage rather than a low sense voltage as in read cycle A, so that the outputted data D0 to D7 on the data bus 30 are correct.

The first and the second read cycles A and B are preferably carried out continuously. However, another operation (e.g. calculate operation etc.) may be carried out between the first and second read cycles as shown in FIG. 4, without adverse effect. The above mentioned read operation can be carried out by an ordinary move operation and/or load operation which are included in standard commercial microcomputers having the usual write signal WR, read signal RD, input signal IN and output signal OUT ports.

The bit error correcting circuit of the present invention is comprised of simple hardware as shown in FIG. 2. Futhermore, the bit error circuit of the present invention can be applied in a plurality of addressing modes. That is, addressing the EEPROM through the address latch circuit is not critical. Other addressing modes will be apparent to those skilled in the art. Further, while in the disclosed embodiment a microcomputer is described, a control circuit such as a microprocessor and CPU core can be substituted for the microcomputer.

It will be understood that the above description of the present invention is susceptible to various other modifications, changes and adaptations, and the same are intended to be comprehended within the meaning and range of equivalents of the appended claims.

What is claimed is:

1. An arrangement comprising a bit error correcting circuit connected to a non-volatile memory and a control circuit, the non-volatile memory having a plurality of sets of memory cells each of which has a plurality of data cells for storing data and a parity cell for storing a first parity bit corresponding to the data and a sense amplifier circuit connected to the sets of memory cells for sensing data with a plurality of sense voltages, the control circuit outputting first and second read signals in respective read cycles, the bit error correcting circuit comprising:

a parity bit generating circuit connected to the non-volatile memory and the control circuit for generating a second parity bit generated from the stored data read from the data cells in response to the first read signal;

a comparison circuit connected to the parity bit generating circuit and the non-volatile memory for comparing the first and second parity bits and outputting a comparison signal which corresponds to the result of the comparison:

a data holding and sense voltage switching circuit connected to the comparison circuit, the control circuit and the non-volatile memory for holding the comparison signal and outputting a holding signal until the second read signal is received, the holding signal controlling sense voltage of the sense amplifier circuit; and an address holding circuit connected to the control circuit, the non-volatile memory and the data holding and sense voltage switching circuit for holding and outputting an address signal from the control circuit to the non-volatile memory in response to the holding signal.

2. An arrangement according to claim 1, wherein said data holding and sense voltage switching circuit comprises a flip-flop circuit.

3. An arrangement according to claim 1, wherein said control circuit is a microcomputer.

4. A bit error correcting system operated by first and second read signals generated during respective read cycles of a control circuit, comprising:

a non-volatile memory having a memory cell array having a plurality of sets of memory cells, each set of memory cells including a plurality of data cells for storing data and a parity cell for storing a first parity bit corresponding to the data, a selection circuit connected to the memory cell array for selecting a predetermined set of memory cells, and a sense amplifier circuit connected to the memory cell array for sensing data with a plurality of sense voltages;

a parity checking circuit connected to the memory cell array for checking a second parity bit generated from the stored data read from the predetermined set of memory cells in response to the first read signal and outputting an error signal;

a data holding circuit connected to the parity checking circuit and the sense amplifier circuit for holding the error signal and outputting a holding signal corresponding to the held error signal until the second read signal is received, the holding signal controlling the sense voltage of the sense amplifier circuit; and an address holding circuit connected to the data holding circuit and the selection circuit for holding and outputting the address signal to the selection circuit in response to the holding signal.

5. A bit error correcting system according to claim 4, wherein said selection means comprises a row and a column decoder.

6. A bit error correcting system according to claim 4, wherein said data holding circuit comprises a flip-flop circuit.

7. A bit error correcting system according to claim 4, wherein said parity checking circuit comprises;

a parity bit generating circuit connected to the memory cell array for generating the second parity bit generated from the stored data; and a comparison circuit connected to the parity bit generating circuit, the data holding circuit and the memory cell array for comparing the first and second parity bits and outputting the error signal.

* * * * *